(12) United States Patent
Thuma et al.

(10) Patent No.: US 11,836,111 B2
(45) Date of Patent: *Dec. 5, 2023

(54) SYSTEMS AND METHODS FOR DATA TRACING

(71) Applicant: Fidelity Information Services, LLC, Jacksonville, FL (US)

(72) Inventors: John Thuma, Lutz, FL (US); Timothy Charles Nargassans, Saint Johns, FL (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,891

(22) Filed: Dec. 1, 2022

(65) Prior Publication Data

US 2023/0101300 A1    Mar. 30, 2023

Related U.S. Application Data

(63) Continuation of application No. 17/119,965, filed on Dec. 11, 2020, now Pat. No. 11,544,222.

(51) Int. Cl.
| | | |
|---|---|---|
| *G06F 16/14* | (2019.01) | |
| *G06F 21/16* | (2013.01) | |
| *G06F 16/13* | (2019.01) | |
| *G06F 21/62* | (2013.01) | |

(52) U.S. Cl.
CPC .......... *G06F 16/152* (2019.01); *G06F 16/137* (2019.01); *G06F 21/16* (2013.01); *G06F 21/6263* (2013.01)

(58) Field of Classification Search
CPC ...... G06F 16/152; G06F 16/137; G06F 21/16; G06F 21/6263; G06F 21/6245
See application file for complete search history.

(56) References Cited

U.S. PATENT DOCUMENTS

| | | |
|---|---|---|
| 7,555,463 B2 | 6/2009 | Schull |
| 7,917,484 B1 | 3/2011 | Vermeulen et al. |
| 8,682,812 B1 | 3/2014 | Ranjan |
| 10,402,589 B1 | 9/2019 | Madisetti |

(Continued)

OTHER PUBLICATIONS

PCT Notification of Transmittal, PCT International Search Report, and PCT Written Opinion, corresponding with PCT/US2021/054510, dated Jan. 31, 2022. (7 pages).

(Continued)

*Primary Examiner* — Angelica Ruiz
(74) *Attorney, Agent, or Firm* — Finnegan, Henderson, Farabow, Garrett & Dunner, LLP

(57) ABSTRACT

The disclosed embodiments include systems and methods for tracing data. A disclosed tracing system can receive a request to access original data. The request can be associated with access request metadata. The tracing system can generate a tracer based at least in part on the access request metadata and can generate an altered version of the first data by inserting the tracer into the original data. The tracing system can update a database or log file associated with the first data to include association information based on the access request metadata. The tracing system can then provide the altered version of the first data in response to the request.

20 Claims, 6 Drawing Sheets

(56) References Cited

U.S. PATENT DOCUMENTS

| | | |
|---|---|---|
| 11,138,164 B1* | 10/2021 | Munuhur Rajagopal ..................... G06F 16/213 |
| 2004/0153649 A1 | 8/2004 | Rhoads et al. |
| 2005/0033777 A1* | 2/2005 | Moraes ................. G06F 16/275 |
| 2005/0049999 A1 | 3/2005 | Birn |
| 2005/0283457 A1 | 12/2005 | Sonkin et al. |
| 2016/0266998 A1 | 9/2016 | Gautallin et al. |
| 2017/0364698 A1 | 12/2017 | Goldfarb |
| 2020/0202039 A1 | 6/2020 | Madisetti |
| 2021/0081366 A1 | 3/2021 | Madisetti |
| 2023/0065530 A1* | 3/2023 | Mohanty ................... G06F 8/60 |

OTHER PUBLICATIONS

Lanzi, et al., "K-Tracer: A System for Extracting Kernel Malware Behavior," School of Computer Science, College of Computing, Georgia Institute of Technology, USA, Dipartimento di Informatica e Comunicazione, Universira degli Studi di Milano, Italy, (16 pages).

\* cited by examiner

Original Data 113

| acct_id | first_name | last_name | MI | trans_date | trans_amount | pan_nbr | merchant_description | zip_code | ssn | birthday |
|---|---|---|---|---|---|---|---|---|---|---|
| 1010 | Mark | Thomas | N | 10/10/2020 | 22.23 | 232-232-222-223 | Walmart Store 8 | 33558 | 111111111 | 3/21/1997 |
| 1010 | Mark | Thomas | N | 10/11/2020 | 66.66 | 232-232-222-223 | CVS Store 9 | 33599 | 111111111 | 3/21/1997 |
| 1010 | Mark | Thomas | N | 10/12/2020 | 55.45 | 232-232-222-223 | Publix Main St | 22222 | 111111111 | 3/21/1997 |
| 1010 | Mark | Thomas | N | 10/13/2020 | 9.99 | 232-232-222-223 | McDonalds POSt33993 | 11111 | 111111111 | 3/21/1997 |
| 2222 | Jane | Doe | T | 9/12/2020 | 10.99 | 111-222-333-444 | Wendy's EdgeSt Pos3 | 22322 | 222222222 | 3/21/1998 |
| 2222 | Jane | Doe | T | 10/5/2020 | 5.88 | 111-222-333-444 | Something Coffee pos338 | 44444 | 222222222 | 3/21/1998 |
| 2222 | Jane | Doe | T | 11/1/2020 | 77.99 | 111-222-333-444 | Legostore Orlando39393 | 33333 | 222222222 | 3/21/1998 |

FIG. 2

Log File 320

| epoch | client_id | in_out | uid | sub_code |
|---|---|---|---|---|
| 2342323433 | 3433 | 1 | 333332 | 92906850-1e06-5f95-a0aa-9c027621d182 |
| 2342323433 | 3433 | 1 | 333332 | .00000000000232233775223 |

Stored Token 307 → (top sub_code row)
Stored Value 309 → (bottom sub_code row)

FIG. 3B

SYSTEMS AND METHODS FOR DATA TRACING

CROSS-REFERENCE TO RELATED APPLICATIONS

This application is a continuation of application Ser. No. 17/119,965, filed Dec. 11, 2020, which is incorporated herein by reference in its entirety.

BACKGROUND OF THE INVENTION

Large datasets of value, sensitive, or confidential data may be routinely updated or shared with authorized users. However, the routine nature of this sharing can make it difficult to identify the source of an unauthorized disclosure of such data.

SUMMARY

The disclosed systems and methods relate to the insertion of tracers into datasets to associate the datasets with the requests used to generate the datasets.

The disclosed embodiments include a system for tracing data. The system can include at least one processor and at least one non-transitory computer-readable medium. The non-transitory computer-readable medium can contain instructions. When executed by the system, the instructions can cause the system to perform operations. The operations can include receiving a request to access first data, the request associated with access request metadata. The operations can further include generating a tracer. The operations can also include generating an altered version of the first data, generation comprising reversibly modifying a value of the first data to include the tracer. The operations can further include storing an association between the request and the altered version of the first data, the association including the access request metadata. The operations can also include providing the altered version of the first data in response to the request.

In some embodiments, the value can include an element of a table; a value of a key-value pair; a value of a field; or an instance of an object. In various embodiments, the value can include a column name of a table; a key name of a key-value pair; a field name of a field; or an object name of an object.

In various embodiments, the value can be a first numeric value; the tracer can be expressed as a second numeric value; and reversibly modifying the value comprises generating a combined value using the value and the tracer, the insignificant figures of the combined value representing the tracer. In some embodiments, the value of the data can be a text value. Reversibly modifying the value can then include embedding the tracer into the value; or concatenating the tracer and the value. In some embodiments, generation can further include adding at least one field, key, or column to the first data, the at least one field, key, or column added to the first data including instances of the tracer token. The at least one field, key, or column added to the first data can further include obfuscation values.

In some embodiments, storing the association can include updating a database or log file associated with the first data to include: association information based on the access request metadata; or the association information and the tracer token.

In some embodiments, the access request metadata can include at least one of: date or time information; or requesting user information.

In various embodiments, the tracer can correspond to a portion of the first data; and the tracer can be generated based at least in part on at least some of the portion of the first data.

In some embodiments, the operations can further include receiving a provision request to provide original data, the provision request associated with provision request metadata. The operations can also include generating a second tracer; receiving the original data; generating the first data; storing an association between the provision request and the first data; the second tracer including the provision request metadata; and storing the first data. Generation of the first data can include reversibly modifying a value of the original data to include the second tracer; or adding at least one field, key, or column to the original data, the at least one field, key, or column added to the original data including instances of the second tracer.

In various embodiments, the operations can further include obtaining suspect data, the suspect data including the tracer; and identifying the request to access the first data using the association and the tracer.

In some embodiments, generation can include reversibly modifying a predetermined number or proportion of values of the data to include the tracer; or reversibly modifying the values to include the tracer with a predetermined probability.

The disclosed embodiments include a method for tracing data. The method can include receiving a request to access first data. The request can be associated with access request metadata. The access request metadata can include date or time information. The access request metadata can include requesting user information. The method can include generating a tracer based at least in part on the access request metadata. The method can further include generating an altered version of the first data, generation comprising adding at least one field, key, or column to the data, the at least one field, key, or column added to the first data including obfuscation values and instances of the tracer. The method can also include updating a database or log file associated with the first data to include association information based on the access request metadata; or the association information and the tracer. The method can further include providing the altered version of the first data in response to the request.

In some embodiments, the generation can include reversibly modifying a predetermined number or proportion of values of the data to include the tracer; or reversibly modifying the values to include the tracer with a predetermined probability.

In various embodiments, generation can further include reversibly modifying a value of the first data to include the tracer. The value can include an element of a table, a value of a key-value pair, a value of a field, or an instance of an object; or the value includes a column name of the table, a key name of the key-value pair, a field name of the field, or an object name of the object.

In some embodiments, the value can include a text value. Reversibly modifying the value can include embedding the tracer token into the value; or concatenating the tracer and the value.

In some embodiments, the tracer can correspond to a portion of the first data; and the tracer can be generated based at least in part on at least some of the portion of the first data.

In some embodiments, the method can further include receiving a provision request to provide original data, the provision request associated with provision request metadata; generating a second tracer based at least in part on the provision request metadata; receiving the original data; generating the first data; storing an association between the provision request and the first data; and storing the first data. Generation can include reversibly modifying a value of the original data to include the second tracer; or adding at least one field, key, or column to the original data, the at least one field, key, or column added to the original data including instances of the second tracer.

In some embodiments, the method can further include obtaining suspect data, the suspect data including the tracer; and identifying the request to access the data using the database or log file and the tracer.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 2 depicts exemplary original data suitable for use with the system of FIG. 1, in accordance with disclosed embodiments.

FIG. 3B depicts an exemplary log file suitable for use with the system of FIG. 1, in accordance with disclosed embodiments.

DETAILED DESCRIPTION

Figure 1:
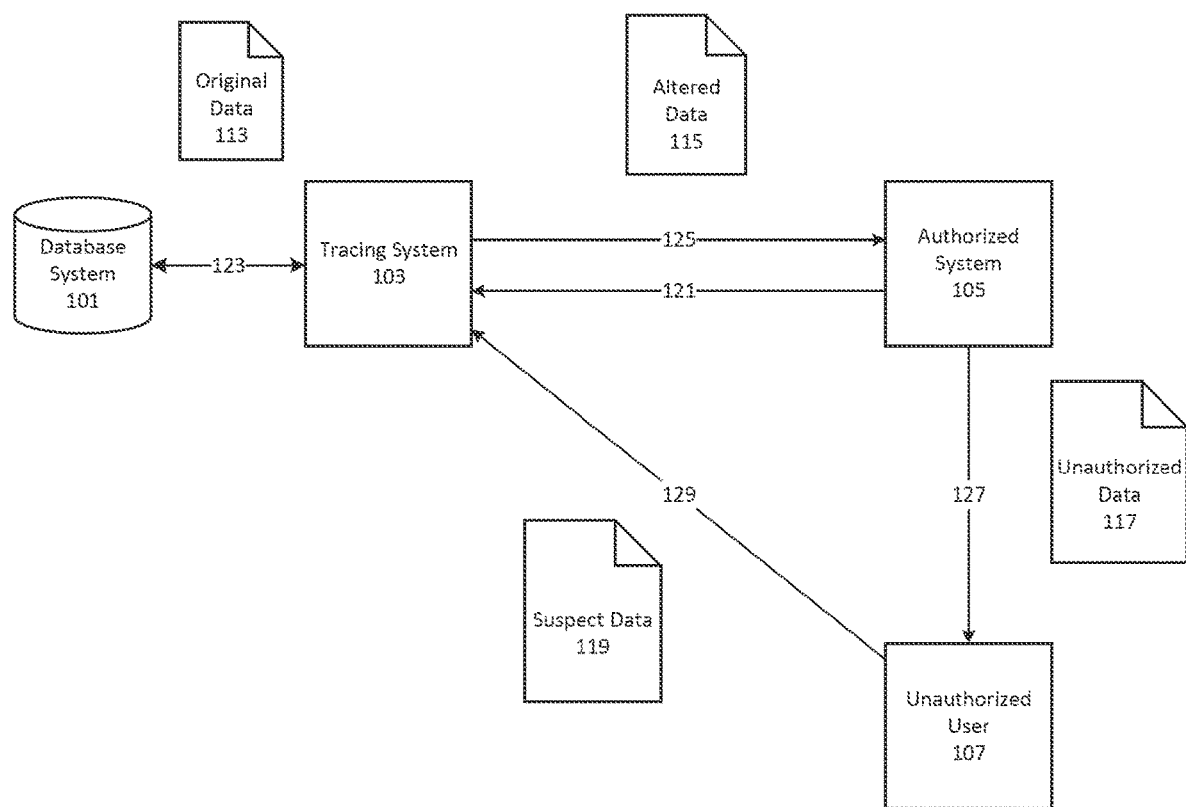
FIG. 1 depicts exemplary operation of a system for tracing data, in accordance with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The unauthorized disclosure of valuable, sensitive, or confidential data (e.g., financial data, transaction data, or personally identifiable information) is an all too-frequent occurrence. Unfortunately, while the existence of a disclosure may be readily apparent, the source of the disclosure may be difficult to identify. Without identifying the source of the disclosure, important questions may remain unresolved, such as the extent of the disclosure, responsibility for the disclosure, and how to prevent additional disclosures.

The data disclosed may often be insufficient to identify the source of the disclosure. A service provider may have shared copies of the data with many authorized entities (e.g., financial services providers, or the like). Determining which entity was the source of the disclosure may be difficult, as conventional systems may provide the same data to each entity.

Even when a disclosure can be localized to a particular entity, important questions concerning the disclosure may remain unresolved. In the normal course of business, multiple constituents (e.g., departments, subsidiaries, employees, contractors, officers, or the like) of the entity may repeatedly request versions of the data. In some instances, multiple requested versions of the data may include the disclosed data, hindering attempts to link the disclosure back to a particular constituent or request. Attempts to associate identifiers with provided data as a whole (e.g., unique file names, digital signatures, or the like) may be inadequate, as the data may be copied or processed prior to disclosure in a manner that overwrites or invalidates these identifiers. Furthermore, overt identifiers may be stripped out by malicious actors.

Consistent with disclosed embodiments, a tracing system can insert tracers into data. The tracers can associate the data with a request to provide or obtain the data. In some embodiments, individual data values can be reversibly modified to insert the tracers. Such tracers may be preserved under typical database operations (e.g., filtering, sub-setting, merging, or the like). The disclosed embodiments may preferably be used to protect extremely large databases (e.g., databases including tens to hundreds of columns and thousands to millions or rows). The envisioned alterations may be difficult to detect in such databases. But when the values of the tracers are known, the tracers may be easily located.

In this manner, the disclosed systems and methods can associate data with a request to provide or obtain the data. In this manner, such systems and methods can assist investigations into the source of an improper disclosure of data. Accordingly, the disclosed embodiments constitute an improvement in the technical field of data security. The disclosed embodiments also provide additional technical improvements and benefits apparent from the following description to those of skill in the art.

FIG. 1 depicts exemplary operation of a system for tracing data (tracing system 103), in accordance with disclosed embodiments. Tracing system 103 can be configured to intermediate between a database (e.g., implemented by database system 101) and systems the requesting access to the database (e.g., authorized system 105). The database may contain sensitive or valuable data and may be, in some instances, routinely or frequently accessed by authorized users. Consistent with disclosed embodiments, such access can include at least one of providing data to the database or querying or otherwise retrieving data from the database. In accordance with disclosed embodiments, tracing system 103 can be configured to insert tracers into data retrieved from or provided to the database. The inserted tracers can establish a lineage of the data, while not interfering with the use of the data by the authorized user.

As disclosed herein, the inserted tracers can be used to identify data accessed without authorization. In some instances, the tracers can indicate how the data was accessed through the tracing system 103 (e.g., a client identifier, a user identifier, a date or time, or the like). Accordingly, investigations into the unauthorized possession of data from the database can benefit from the inserted tracers. For example, the inserted tracers can identify a user that downloaded the data. An investigation can then focus on how data moved from the possession of that user into the possession of unauthorized users. In this manner, the tracing system and operations depicted in FIG. 1 can improve the security of systems that share sensitive or valuable data with clients.

Database system 101 can be configured to implement one or more databases for storing data, consistent with disclosed embodiments. Database system 101 can be implemented using one or more computing devices (e.g., a mobile device, a desktop computer or workstation, a computing cluster, a cloud computing platform, or the like). The disclosed embodiments are not limited to any particular number of databases, type(s) of databases (e.g., structured, unstructured, relational, document-oriented, object-oriented, etc.) or database applications, or interfaces for access the database(s). As a non-limited example, database system 101 can be implemented as a cloud-hosted database accessible using an application programing interface. To continue this example, database system 101 can include S3 buckets hosted on AMAZON WEB SERVICES. As a further example, the database could be implemented using DATABRICKS, DELTA LAKE, or the like. One of skill in the art would recognize that many suitable database implementations are possible.

Tracing system 103 can be configured to trace data entering or leaving database system 101, consistent with disclosed embodiments. Tracing system 103 can be configured to receive requests (e.g., request 121) to provide data to user systems (e.g., queries or the like) or to store data into database system 101. The disclosed embodiments are not limited to any particular request type or format. For example, without limitation, the requests can be provided through API calls, invocation of web services exposed by tracing system 103, or requests for computer-readable media containing data.

Tracing system 103 can be configured to generate tracers based on the requests. Tracers can be universal unique identifiers. For example, tracers can be generated by hashing information representing or associated with a request. The disclosed embodiments are not limited to any particular hashing algorithm or method of generate a universal unique identifier.

Tracing system 103 can be configured to communicate 123 with database system 101 to obtain original data 113. The disclosed embodiments are not limited to any particular communication type or format. For example, without limitation, communication between database system 101 and tracing system 103 can be performed through function calls, API calls, or invocation of web services exposed by at least one of tracing system 103 and database system 101. The disclosed embodiments are not limited to any particular structure or format for original data 113. Consistent with disclosed embodiments, original data 113 can be or include relational data, document or object data, key-value data, binary data, or the like. Original data 113 can be provided by database system 101 encrypted. Such encrypted data can be decrypted by tracing system 103 and used to generate altered data 115.

Tracing system 103 can be configured to generate altered data 115 that includes the tracers. Tracing system 103 can generate altered data 115 by reversibly modifying values of original data 113 to include the tracers. As described herein with regards to FIG. 3A, such reversible modification can include changing values of the data (e.g., the value of a cell in a table) or changing the description of the data (e.g., changing the value of a column name or a table). The modification can be reversible in that the original data may be recoverable from the altered data.

Tracing system 103 can be configured to associate the altered data with the request using the tracers. In some embodiments, tracing system can maintain a record of each request. As a non-limiting example, such a record can be implemented using a log file. The record can specify the tracers included in the altered data or information useable to generate the tracers included in the altered data.

In some instances, tracing system 103 can be configured to generate altered data 115 using original data 113 received from authorized system 105 or other systems associated with database system 101. In such instances, tracing system 103 can be configured to provide the altered data to database system 101 for storage (not shown in FIG. 1). In some instances, tracing system 103 can be configured to generate altered data 115 using original data 113 received from database system 101. In such instances, tracing system 103 can be configured to provide (e.g., in response 125) altered data 115 to the authorized system 105 (e.g., as shown in FIG. 1).

The disclosed embodiments are not limited to embodiments in which tracing system 103 interfaces directly with user systems, as shown in FIG. 1. For example, in some embodiments database system 101 can be configured to receive requests directly from user systems. Database system 101 can provide the requests to tracing system 103 to generate tracers. Database system 101 can also provide the data (either received from the requesting user system or for provision to the requesting user system) for alteration. Tracing system 103 can generate the tracers, alter the data, and store the association between the request and the altered data. Tracing system 103 can then provide the altered data to database system 101, which can store or provide the altered data, depending on whether the request was to provide or receive data. As an additional example, in some embodiments database system 101 and tracing system 103 can be configured to receive requests from another system. For example, an application system can receive a request to provide data to a user system. The application system can provide a copy or version of the request to database system 101 and a copy or version of the request to tracing system 103. The database system can provide the requested data to tracing system 103 (directly or through the application system). Tracing system 103 can generate the tracers, alter the data, and store the association between the altered data and the request. Tracing system 103 can provide the altered data to the application system, which can provide the altered data to the requesting user.

Authorized system 105 can include at least one computing system that provides requests (e.g., request 121) to tracing system 103 (directly or indirectly through database system 101 or an application system, as described herein). Authorized system 105 is not limited to any particular type of computing system. Consistent with disclosed embodiments, the at least one computing system can be a mobile computing device, a desktop or workstation, a computing cluster, or a cloud-computing platform, or another suitable computing device. The requests can be provided over a network. The disclosed embodiments are not limited to any particular network or type of network. For example, without limitation, the network could be or include a wired network, a wireless network (e.g., a WiFi or cellular network), or another suitable type of network. The network could be a local area network, wide area network, or the internet.

Authorized system 105 can be associated with an entity authorized to access the data in the database. In some embodiments, the entity can be a legal or natural person. The entity be authorized to obtain or provide data to database system 101. The entity may not be authorized to share the data with other entities or may be restricted in the types of entities with which it may share the data. These restrictions may be imposed as a condition for accessing the data. For example, the data can be financial transaction data (e.g., records of consumer or business transactions such as credit card or bankcard payments, ATM deposits or withdrawals, or the like). The entity can be a financial institution, which may be authorized to access the data. However, the entity may not be allowed to share the data with other entities, or may not be allowed to share the data with certain types of entities (e.g., the entity may not be allowed to share the data with hedge funds, brokerages, marketing or sales agencies, or the like).

Unauthorized user 107 can be an entity lacking authorization to access database system 101. For example, database system 101 may be associated with a licensing entity, which may offer access to the data stored in database system 101 according to the terms of a license. Unauthorized user 107 may be unlicensed or may obtain data outside the scope of an existing license.

Unauthorized user 107 may obtain (e.g., via disclosure 127) unauthorized data 117 from authorized system 105. Unauthorized data 117 may be or include at least some of altered data 115. Altered data 115 may have been processed to generate unauthorized data 117. As a non-limiting example, when altered data 115 is a table, columns and rows may have been added to or removed from altered data 115 to generate unauthorized data 117. As a further example, altered data 115 may have been sorted or filtered to generate unauthorized data 117.

Unauthorized users may, in some instances, obtain unauthorized data 117 by purchasing (e.g., in violation of licensing terms of the authorized users) the data from authorized users or constituents of authorized users (e.g., present or former employees or contractors of the authorized users). Unauthorized users may, in various instances, hack into authorized system 105 to obtain the data, or may purchase or otherwise obtain the data from hackers. The disclosed embodiments are not limited to a particular type of unauthorized user, or a particular manner in which the unauthorized user obtains the data.

Unauthorized user 107 may attempt to use the data illegally (e.g., to open fraudulent financial services accounts or make fraudulent transactions) or contrary to the interests of the licensing entity or clients of the licensing entity. As a non-limiting example, the data may be valuable, sensitive, or confidential and may have financial implications for a publicly traded client of the licensing entity. An unauthorized user could buy or sell stock or stock options of the client based on the data, thereby harming the present shareholders of the client. As may be appreciated, the data may be very valuable.

The entity associated with database system 101 may become aware of disclosure 127 in multiple ways. In some instances, for example, the entity may obtain 129 suspect data 119. The disclosed embodiments are not limited to any particular method of obtaining the suspect data. In some instances, the entity may obtain suspect data 119 from a website trafficking stolen data (e.g., a file sharing site), law enforcement authorities, the media, clients that have themselves obtained suspect data 119, or other sources. In some instances, an association between suspect data 119 and altered data 115 may not be immediately apparent. As described above, unauthorized data 117 may differ from altered data 115. Additional processing may have been performed on unauthorized data 117 to generate suspect data 119, further disguising the origin of suspect data 119. Furthermore, as would be appreciated by those of skill in the art, while altered data 115 and suspect data 119 may both derive from original data 113 and therefore share common values (e.g., common records or rows, identical field names, or the like), such common values may not be sufficient to identify the source of disclosure 127. For example, the same original data may be provided to multiple clients. As an additional example, when the data has only been provided to one client, multiple versions of the data may have been requested by that same client over a period of time, or by different employees of the client. A conventional system may have trouble determining which version was disclosed.

However, consistent with disclosed embodiments, tracing system 103 can be used to tie the suspect data back to a particular request. As described herein, original data 113 can be altered at varying levels of granularity (e.g., from adding columns, fields, or the like to reversibly modifying values) to insert tracers. The tracers can be associated with the particular request the resulted in provision of the data to authorized system 105 and this association can be stored. Using the association, suspect data 119 can be tied back to the request, even when multiple versions of the data, corresponding to different requests, have been provided, or when only fragments of original data 113 remain unchanged in suspect data 119.

FIG. 2 depicts exemplary original data 113 suitable for use with the system of FIG. 1, in accordance with disclosed embodiments. While FIG. 2 depicts relational data stored in tabular form, the disclosed embodiments are not so limited. In some embodiments, original data 113 can include structured (e.g., relational, or the like), semi-structured (e.g., XML, JSON, or the like), or unstructured (e.g., documents, or the like) data. For ease of explanation, original data 113 includes only seven rows and eleven columns. In a typical instance, original data 113 may include tens to hundreds (or more) columns and thousands to millions (or more) rows. Accordingly identifying inserted tracers may be very difficult for an unauthorized user, particularly when the unauthorized user is unaware of the semantics or the locations of the token. However, even such large data sets can be quickly searched for the presence of tokens having known values.

As depicted in FIG. 2, original data 113 can include multiple types of data. Consistent with disclosed embodiments, values in alphanumeric columns can be modified to include numeric or textual characters without interfering with the processing of the column (merchant_description, first_name, acc_id, or the like). Consistent with disclosed embodiments, values in numeric columns cannot be modified to include textual characters without interfering with the processing of the column (e.g., trans_amount, or the like). In some embodiments, a datatype of the column can determine whether the column is alphanumeric or numeric. For example, char or varchar datatypes may be alphanumeric, while decimal, numeric, money and smallmoney can be numeric.

Figure 3A:
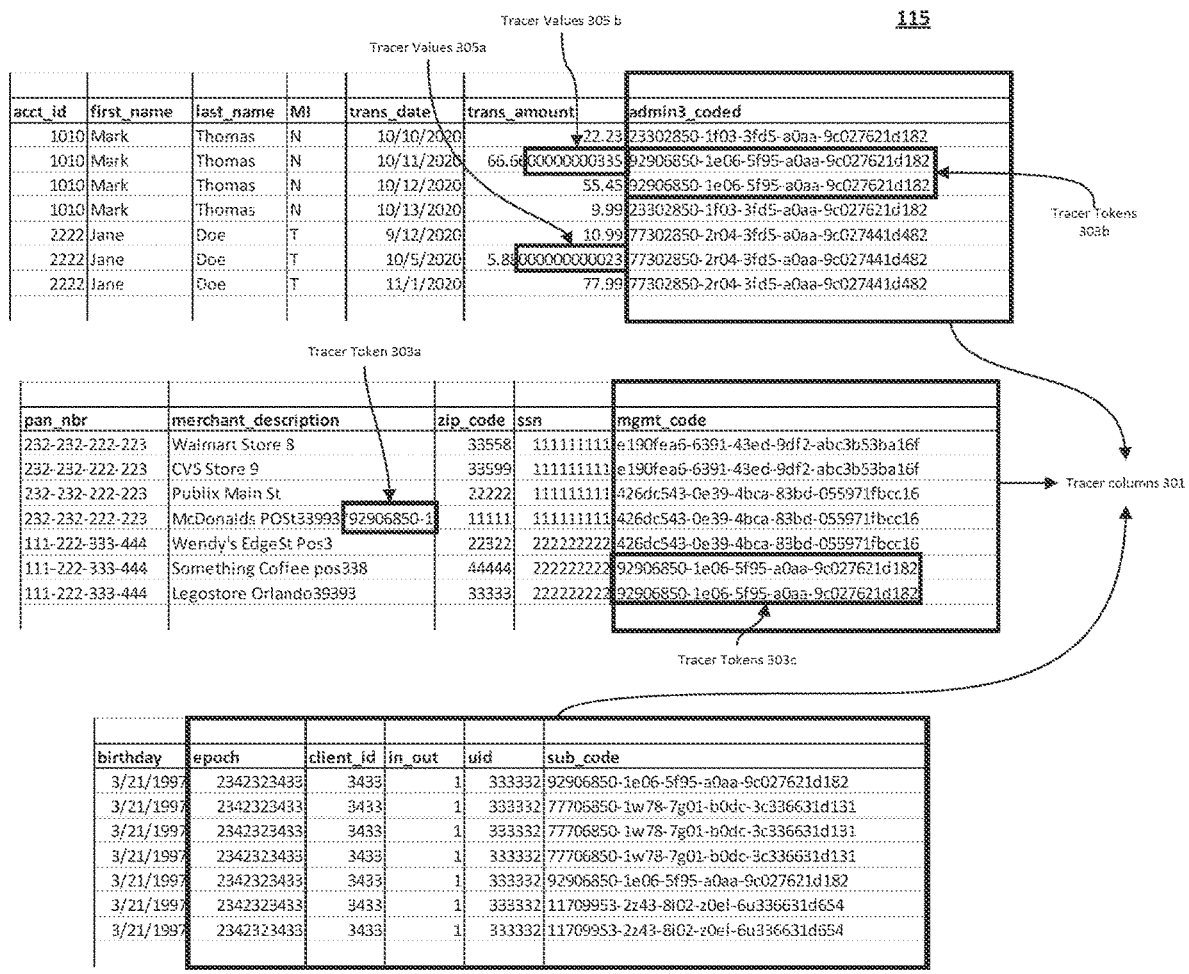
FIG. 3A depicts exemplary altered data suitable for use with the system of FIG. 1, in accordance with disclosed embodiments.

FIG. 3A depicts exemplary altered data 115 suitable for use with the system of FIG. 1, in accordance with disclosed embodiments. While FIG. 3A depicts relational data stored in tabular form, the disclosed embodiments are not so limited. As depicted in FIG. 3A, original data 113 has been modified by the insertion of tracer columns 301, tracer tokens 303a to 303c, and tracer values 305a and 305b. Consistent with disclosed embodiments, these modifications can associate altered data 115 and the request that resulted in the generation of altered data 115.

Consistent with disclosed embodiments, tracing system 103 can be configured to generate at least one tracer for insertion into original data 113. In some embodiments, at least one numeric version of the tracer can be created for insertion into one or more numeric values of the original data. In various embodiments, at least one alphanumeric version of the tracer can be created for insertion into alphanumeric values of the original data.

Consistent with disclosed embodiments, a tracer can be generated based at least in part on metadata associated with the request. Such metadata can include, for example, when the request occurred, a client associated with the request, an authorized system of the client associated with the request, a user of the client associated with the request, a type of the request (e.g., whether the request was to obtain data from database system 101 or provide data to database system 101, or the like), parameters of the request (e.g., query parameters, an IP address associated with the request, a MAC address associated with the request, a geographic location associated with the request, or other metadata associated with the request that could later be used to identify a source of disclosure 127). In some embodiments, the token can be generated based on metadata associated with database system 101 or tracing system 103 (e.g., an identifier of database system 101 or tracing system 103, or the like). In various embodiments the tracer can be generated from a nonce value. The tracer can be generated using any suitable algorithm for generating universally unique identifier values from input data. In some embodiments, the tracer can be generated using a hash function (e.g., a noncryptographic hash function, such as FAST-HASH or the like; a cryptographic hash function, such as SHA-512, MD5, MD6, or the like; or another suitable hash function). As a non-limiting example, generation of a tracer can include generation of a message by combining (e.g., concatenating, or the like) a time of the request, a client associated with the request, a user identifier of user associated with the client (e.g., an employee of the logged onto tracing system 103), and IP address, an identifier of tracing system 103, and a nonce. The SHA-256 hash function can be applied to the message to generate the token. The resulting tracer can be expressed as a numeric value or as an alphanumeric value (e.g., through a binary-to-text conversion scheme, such as a Base36 encoding or another suitable conversion method).

The disclosed embodiments are not limited to embodiments in which the tracer is generated based on or using the request metadata. In some embodiments, the tracer may be a unique identifier, but may not be generated from the request metadata. Instead, the uniqueness of the tracer may be sufficient to establish the association between the request and altered data 115. For example, the request metadata can be stored in a database or log file together with the unique identifier. In that manner, even though the unique identifier is not generate using the request metadata, the unique identifier is still associated with the unique identifier.

In some embodiments, at least some of the values used to generate the tracer (e.g., request metadata, database system 101 or tracing system 103 metadata, or the like) can be processed before being used to generate the token (e.g., raw values can be categorized or coded, cleaned, formatted, or the like). In various embodiments, the metadata values can be used directly.

Consistent with disclosed embodiment, one or more values of original data 133 can be reversible modified to include the tracer. For clarity, the following description refers to columns, rows, and elements of a table (e.g., as depicted in FIG. 3A). But the disclosed embodiments can be used with other data structures, such as key-value pair values, field values, or object instances.

In some embodiments, a token can be inserted into an alphanumeric value. The token can be concatenated with the original value or embedded into the original value. In some embodiments, the token can be separated from the original value using delimiter(s). In various embodiments, the token can be inserted at a predetermined character location in the original value. A token inserted at a predetermined location can, in some embodiments, have a predetermined width. As a non-limiting example, as depicted in FIG. 3A, tracer token 303a (e.g., "92906850-1e06-5f95-a0aa-9c027621d182") has been concatenated with the original value at row 4, column 8 of original data 113 (e.g., "McDonalds POSt33993") to generate an altered value (e.g., "McDonalds POSt33993*92906850-1e06-5f95-a0aa-9c027621d182").

In this non-limiting example, an asterisk has been used as a delimiter. In another non-limiting example, a token could be embedded using delimiters (e.g., McDonalds*92906850-1e06-5f95-a0aa-9c027621d182*POSt33993). As a further non-limiting example, a token can be embedded by embedding the token at a fixed character position in the original data (e.g., the token could be embedded between the $3^{rd}$ and $4^{th}$ characters in the original data).

Consistent with disclosed embodiments, the value chosen for insertion of the token may be selected based on the distribution or semantics of the data. For example, tokens may be inserted into values in columns containing highly variable value distributions, as the insertion of tokens may be less apparent in such columns. As an additional example, tokens may be inserted into values in columns containing data that is expected to include values resembling tokens. In the example depicted in FIG. 3A, column "merchant_description" may be chosen because such descriptions often include a merchant identifier (e.g., "McDonalds") and a point of sale identifier (e.g., "POSt33993"). The concatenation of the existing data and the token may therefor resemble other values in the original data. Furthermore, both the merchant identifier and the point of sale identifier can be highly variable. Authorized users are therefore likely to disregard this column, or to create a new column containing a cleansed version of the "merchant_description" column by mapping values in the "merchant_description" column to a smaller set of values (e.g., "McDonalds POSt33993" might map to "McDonalds"). The techniques for such mapping are known in the art and the token can be inserted such that these techniques remove it without alerting the authorized user.

In some embodiments, a token can be inserted into an alphanumeric value. The token can be represented by the insignificant digits of the numeric value. For example, as depicted in FIG. 3A, the column "trans_amount" can represent monetary transaction amounts. In this example, according to the schema of original data 113, such transactions may be represented numbers having no more than two decimal places. Additional decimal places may be disregarded (e.g., truncated, rounded, or otherwise discarded) by users when processing or analyzing altered data 115. Accordingly, consistent with disclosed embodiments, the token can be included into the insignificant digits of the value, without affecting how the value would be processed by an authorized user. In some embodiments, the token can be included by scaling the token by an appropriate scaling factor and then combining the token and the original value. For example, the token can be converted to base 10, scaled such that the most significant digit of the token is on the order of 0.0000000000001, and then added to or subtracted from the original value). Whether the token is added to or subtracted from the original value may depend on whether consumers of the date use floor( ), round( ), or ceiling( ) to clean data. In the example depicted in FIG. 3A, tracer value 305a and tracer value 305b have been added to original values of original data 113 to generated reversibly altered values for altered data 115.

In some embodiments, a token can be inserted into a metadata value of the data. For example, the token can be inserted into a column name (or a key name of a key-value pair, or a field name of a field, or an object name of an object. For example, the column name "acct_id" could be renamed "acct_id*92906850-1e06-5f95-a0aa-9c027621d182". In some embodiments, an additional column could be created. The additional column could include dummy data. The name of the column could be the token.

In some embodiments, additional columns can be inserted into original data 113. In some embodiments, the additional columns can include request metadata values. As a non-limiting example, altered data 115 includes columns "epoch" (which includes the time the request was made as a UNIX epoch value), "client_id" (which can be a code identifying the authorized entity), "in_out" (which can be a code indicating whether the request was to provide data for storage into database system 101 or to obtain data from database system 101), and "uid" (which can be an identifier of an employee or contractor of the authorized entity that made or is associated with the request). Such columns may enable the data to be associated with the request without requiring tracing system 103 to store the association. While in this non-limiting example, the columns storing the request metadata values are contiguous and have names suggestive of their contents, the disclosed embodiments are not so limited. In practice, the columns may be dispersed among tens to hundreds of other columns in original data 113. Furthermore, tracing system 103 can create these columns with randomized or anodyne names that are unlikely to attract the attention of an unauthorized user.

In various embodiments, the additional columns can include one or more instances of the tracer token. As depicted in FIG. 3A, for example, columns "admin3_coded" and "mgmet_code" include tracer tokens 303b and tracer tokens 303c, respectively. In this non-limiting example, the value of the tracer tokens included in these columns is the same (and the same as the value of the tracer token embedded in column "merchant_description"). However, the disclosed embodiments are not so limited. Different tokens can be used in different columns, or with different columns. These different tokens can be generated using differing subsets or orderings of the request metadata, or differing nonces.

In some instances, in addition to the tracer tokens, the additional columns can include obfuscation values. The obfuscation values can resemble the tokens (e.g., in length, datatype, range of values, structure, or the like). For example, both the obfuscation values depicted in FIG. 3A (e.g., the values of columns "admin3_coded" and "mgmet_code" other than tracer tokens 303b and tracer tokens 303c) and the tracer tokens (e.g., tracer tokens 303b and tracer tokens 303c) have four parts separated by hyphens. The parts are alphanumeric and corresponding parts have the same number of tokens in both the tracer tokens and the obfuscation values. The obfuscation values may obscure the presence of the token values by making the values of the added columns appear to vary.

In some embodiments, a token value can be distributed among entries in a row (or among values of a keys, value of fields, objects, etc.). For example, a first portion of a token can be inserted into a first value in a first row of original data 113. A remainder of the token can be inserted into a second value of the first row of original data 113. For example, the five-part token in FIG. 3A (e.g., tracer token 303a, 303b, 303c) could be distributed among five values in a row. The rows need not be contiguous and the ordering of the rows need not match of the ordering of the parts of the token (e.g, the first column to include a part of the token could include the $4^{th}$ part of the token, while the second column to include a part of the token could include the $1^{st}$ part of the token). Similarly, parts of the token could be distributed among column names. In some embodiments, parts of a single token could be distributed among multiple rows.

In some embodiments, a number of tracer tokens inserted into original data 113 can depend on the original data. In some embodiments, this number can be less than a predetermined proportion (e.g., a proportion between 0.001% and 1%, or another suitable proportion) of the existing rows or the existing elements in original data 113. For example, when original data 113 includes 1 million rows and the proportion is 0.1%, then tracer tokens may be inserted into values in 1000 rows. As an additional example, when original data 113 includes 1 million rows and 1000 columns and the proportion is 0.1%, then tracer tokens may be inserted into 1 million values in original data 113. In some embodiments, the number of insertions can be deterministically determined (e.g., tracing system 103 can specify that 1000 tracing tokens will be inserted and then insert 1000 tracing tokens). In various embodiments, the number of insertions can be probabilistically determined (e.g., tracing system 103 can determine whether to insert a tracing token into a row or value with a predetermined probability). In some embodiments, the number of tracing tokens can be predetermined. For example, 100 tokens may be inserted into any dataset with more that 1,000 rows and 1000 tokens may be inserted into any dataset with more than 10,000 rows. While discussed in terms of relational data having rows and columns, a number of tokens can similarly be determined for other day structures (e.g., key-value, object-orient, unstructured, etc.).

In some embodiments, a number of additional columns inserted into original data 113 can depend on a size of original data 113. In some embodiments, this number can be less than a predetermined proportion (e.g., a proportion between 0.1% and 1%, or another suitable proportion) of the existing columns. As described herein, the columns may contain request metadata. When the amount of request metadata is greater than the number of additional columns that can be inserted into the original data, tracing system 103 may insert columns corresponding to only a subset of the request metadata. For example, when the original data includes 200 columns and the threshold is 1%, tracing system 103 may add two or fewer additional columns to the data. In this example, tracing system 103 may be configured to determine the IP address, authorized entity, user, and date/time of the request. As only two additional columns may be added, tracing system 103 may be configured to select two of these characteristics of the request for insertion into the original data in the form of the two additional columns (e.g., an additional column listing an indicator of the authorized entity may be added and another additional column listing an indicator of the user may be added). When the original data include 2000 columns, tracing system 103 may add 20 or fewer additional columns. In this example, there are only four characteristics of the request determined by tracing system 103, so four additional columns listing indicators for each of these characteristics may be added to the data. In some embodiments, tracing system 103 may add additional columns including tracer tokens and obfuscation values. In the preceding example, tracing system 103 may insert into the original data 4 columns including request metadata and 16 or fewer columns including tracer tokens and obfuscation values. Alternatively, tracing system 103 can insert 20 or fewer columns including tracer tokens and obfuscation values and no columns including request metadata.

In some embodiments, a predetermined number of columns may be added. The predetermined number of columns may equal the number of request metadata characteristics determined by tracing system 103, or may equal a number of particularly determinative request metadata characteristics (e.g., authorized entity, user id, and datetime, or the like). While discussed in terms of relational data having rows and columns, a number of additional keys, objects, documents, or the like can similarly be determined for other day structures.

FIG. 3B depicts an exemplary log file 320 suitable for use with the system of FIG. 1, in accordance with disclosed embodiments. As described with regards to FIG. 3A, tracing system 103 can be configured to generate altered data 115 by inserting tracers into original data 113, in accordance with disclosed embodiments. Tracing system 103 can be configured to store an association between the request and altered data 115. In some embodiments, the association can be between the request and the tracers encoded into altered data 115. In various embodiments, the association can be stored as a record in a database, an entry in a log file, or as data in some other suitable repository. The database or log file can be stored in a database, memory, or computer-readable medium accessible to tracing system 103. In some embodiments, for example, log file 320 can be stored in a database or log file of database system 101, tracing system 103, or a separate system.

In the non-limiting example depicted in FIG. 3B, Log file 320 is configured to store data in rows and columns. For example, an "epoch" column stores when the request was made. A "client_id" column stores an identifier of the authorized entity associated with the authorized system requesting the data. An "in_out" column stores an indicator of whether the request was to provide data (e.g., a "0" value) or obtain data (e.g., a "1" value). A "uid" column includes an indicator of a user (e.g., an employee or contractor of the authorized entity) that provided the request. And the "sub_code" column stores an inserted token.

In some embodiments, as shown in FIG. 3B, each row can correspond to a request. In this example, the first row includes stored token 307, which corresponds to the tracer tokens 303a to 303c that were inserted into alphanumeric fields of original data 113 to generate altered data 115. In this example, the second row includes stored value 309, which corresponds to the tracer values 305a and 305b that were inserted into numeric fields of original data 113 to generate altered data 115. In various embodiments, each row can include multiple tokens (e.g., all of the tokens associated with a request).

In some embodiments, the tokens may not be stored in log file 320. Instead, the request metadata may be stored, and the tokens may be generated as needed to identify data (e.g., suspect data 119).

While FIG. 3B depicts log file 320 as storing data in a relational form, the disclosed embodiments are not so limited. In some embodiments, log file 320 can be configured to store associations between requests and altered data as entries in a text file. As a non-limiting example, the entries can have the following format:

ip_address authorized_entity user datetime request_type token(s)

where ip_address is the address of the authorization system, authorized_entity is an identifier of the entity associated with the request (e.g., a financial institution or the like), user is an identifier of the employee or contract submitting the request (e.g., a user account identifier), datetime is the time and date of the request, request_type is whether the request is for providing data to or receiving data from database system 101, and token(s) are the values of the one or more tokens inserted into the data. As would be appreciated by those of skill in the art, many other formats may be used.

Figure 4:
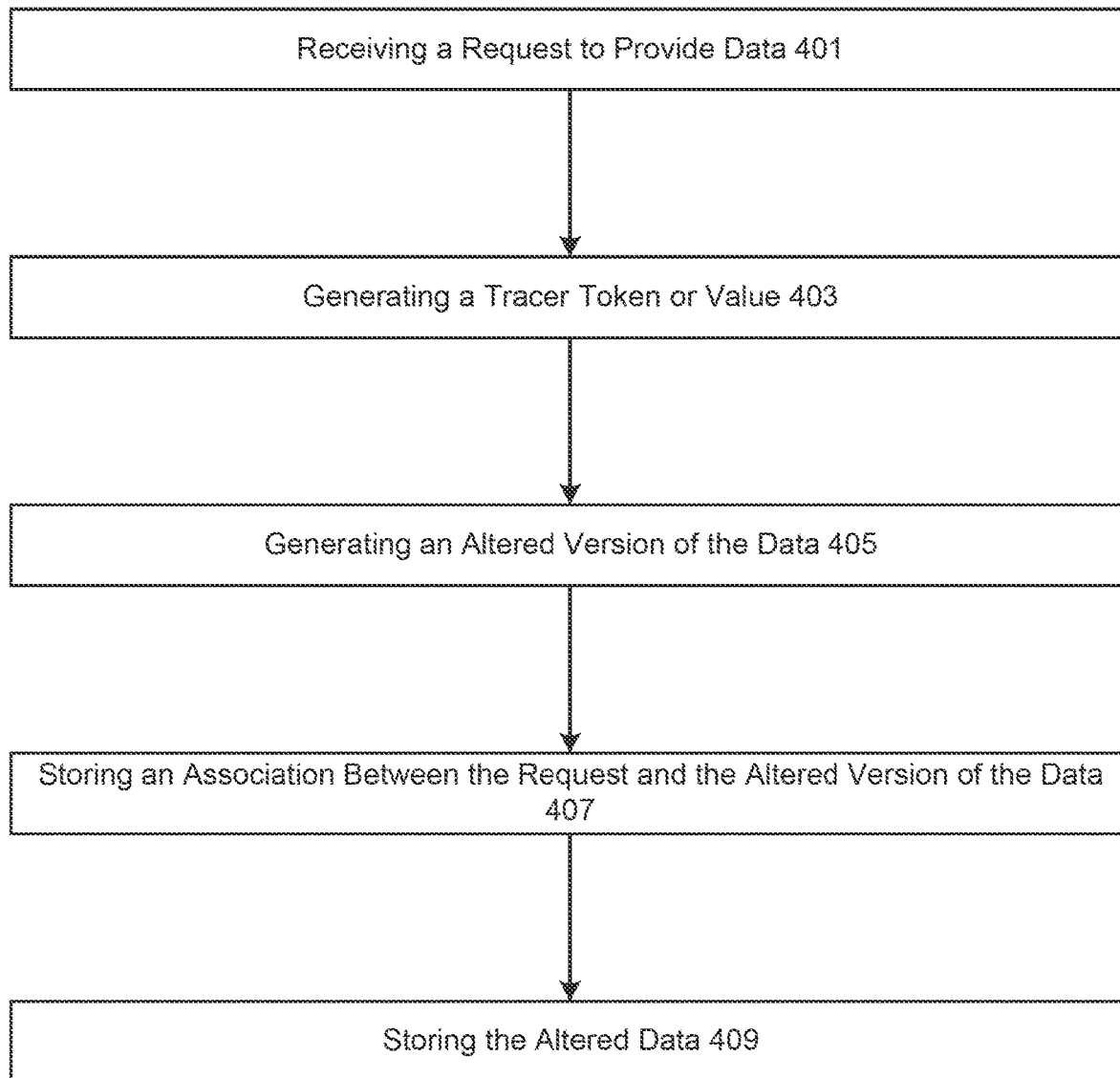
FIG. 4 depicts a method for tracing the receipt of data, in accordance with disclosed embodiments.

FIG. 4 depicts a method 400 for tracing the receipt of data, in accordance with disclosed embodiments. Method 400 can be performed by a tracing system (e.g., tracing system 103). When examining suspect data (e.g., suspect data 119), method 400 can support determination of the authorized users that providing the disclosed data that was disclosed. In some instances, these authorized users can then be notified of the unauthorized disclosure of this data. Thus method 400 can support increased transparency, traceability, and detectability around unauthorized disclosures of valuable, sensitive, or confidential data.

In step 401 of method 400, the tracing system can receive a request from an authorized system to provide data to database system 101. As described herein, a tracing system can receive the request directly or indirectly (e.g., through database system 101 or an application system, or the like) from an authorized system (e.g., authorized system 105). The request can be received using a network that provides a communicative connection to the authorized system. In some embodiments, the request can be or include an API call, function call, invocation of an exposed web service, or the like.

For ease of comprehension, method 400 is described with regards to relational data having rows and columns, but method 400 is not limited to such data. Method 400 could also be used with key-value data, objected-oriented data, document-oriented data, or unstructured data.

In some embodiments, the request can include or reference original data for storage by a database system (e.g., database system 101). In some instances, the authorized system can upload the original data to the tracing system (or the database system, an application system, or the like, which may then forward the original data to the tracing system. In various instances, the authorized system can provide a reference (e.g., a URL, or the like) to the original data. In such instances, the tracing system can obtain the original data using the reference.

In step 403 of method 400, the tracing system can generate at least one of tracer token(s) or tracer value(s). These tracers can be intended to uniquely identify the request and, in some embodiments, may be created based on the metadata concerning the request. The tracers can be created using any suitable algorithm for creating such unique identifiers. Consistent with disclosed embodiments, the tracers can be created by hashing a message. In some embodiments, the message can be based at least in part on the metadata concerning the request, metadata associated with the database system or tracing system, a nonce, or the like. In various embodiments, the message may not be based on such metadata. Tracers may be expressed as alphanumeric sequences or numeric sequences. In some embodiments, multiple different tracers can be created for the same request.

In step 405 of method 400, the tracing system can generate an altered version of the original data (e.g., altered data 115). The tracing system can generate the altered version of the original data by inserting the tracers generated in step 403 into values in the original data. The values can be elements of a table (or values of key value pairs, or values of fields, or instances of objects, or the like). The values can be column names of the table (or key names of key-value pairs, or field names of fields, or the like). The tracers can be inserted by reversibly modifying the values to include the token. Tracer values can be inserted into numeric values by combining the tracer value and the numeric value such that the insignificant digits of the combined value represent the tracer value. In some embodiments, tokens can be divided between values (e.g., a first part of a token can be inserted into a first value and a second part of the token can be inserted into a second value). In some embodiments, the tracing system can alternatively or additionally insert columns into the original data. In some instances, the additional columns can include metadata of the request. In various embodiments, the additional columns can include tracers (which can be numeric tracer values or alphanumeric tracer tokens) and obfuscation values.

In step 407 of method 400, the tracing system can store an association between the request and the original data. In some embodiments, the association can be stored in a database or log file (e.g., log file 320, or the like). The tracing system can store the association directly or indirectly (e.g., by providing instructions or data to another system, such as the database system, to store the association in a database or log file maintained by or accessible to that system). The association can include metadata associated with the request. In some embodiments, the association can include the tracers inserted into the original data. In various embodiments, the association may not include the tracers—instead, in such embodiments, the tracing system may recreate the tracers as needed to identify suspect data.

In step 409 of method 400, the altered data can be stored. In some embodiments, the tracing system can provide the altered data to the database system to store the data.

Figure 5:
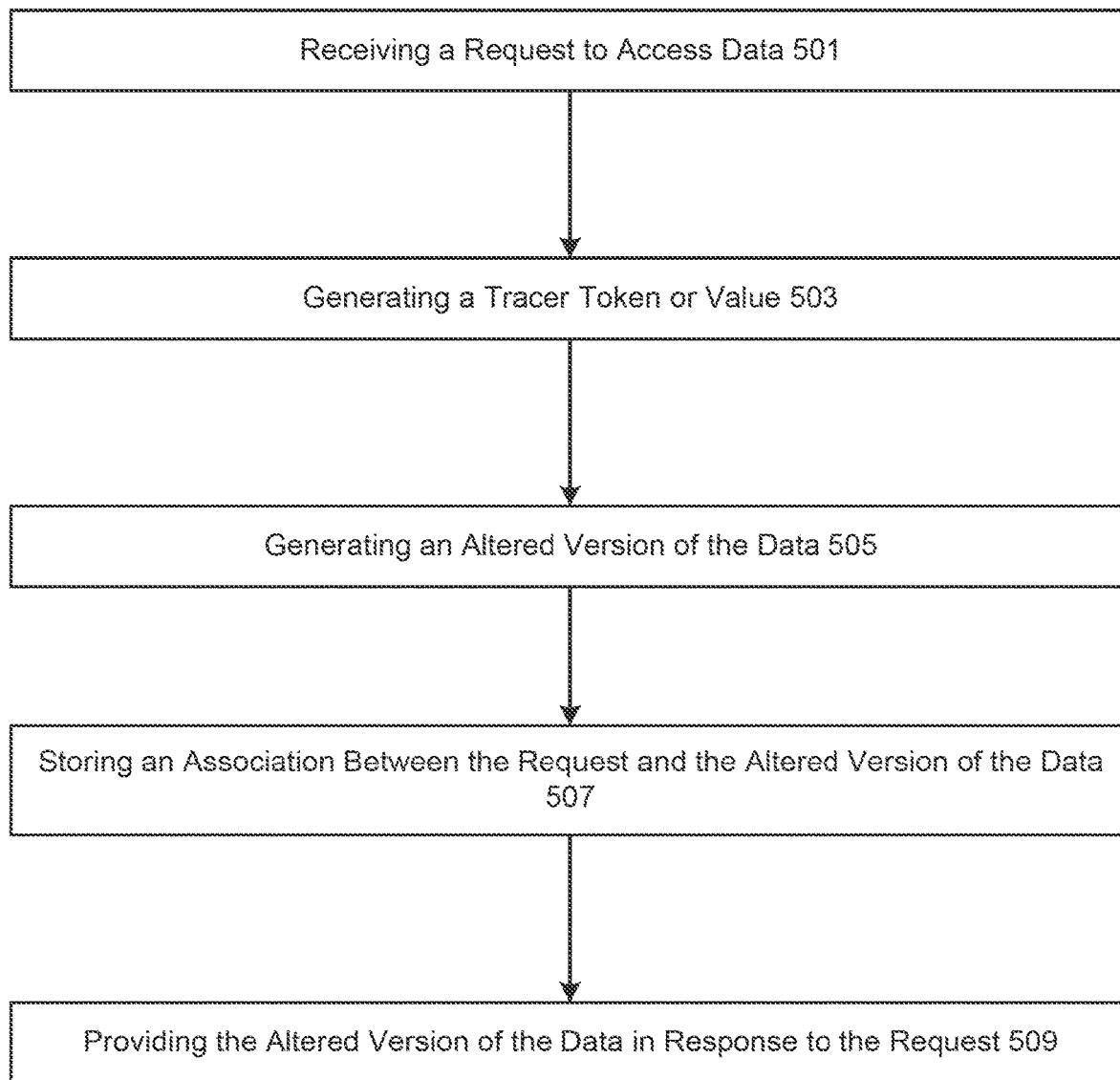
FIG. 5 depicts a method for tracing the provision of data, in accordance with disclosed embodiments.

FIG. 5 depicts a method 500 for tracing the provision of data, in accordance with disclosed embodiments. Method 500 can be performed by a tracing system (e.g., tracing system 103). When examining suspect data (e.g., suspect data 119), method 500 can support determination of the authorized users that disclosed (intentionally or inadvertently) the data. In some instances, method 500 can determine the request that resulted in the data that was disclosed, including metadata of the request such as the IP address of the requesting system, the user id of the employee, contractor, or the like that made the request, the geographic location of the request, the date/time of the request, or other suitable request metadata. This information can support an investigation into the disclosure of the data, allowing investigators to quick zero in on who disclosed (or enabled disclosure of) the data. Thus method 500 can support increased transparency, traceability, and detectability around unauthorized disclosures of valuable, sensitive, or confidential data.

In step 501 of method 500, the tracing system can receive a request (e.g., request 121) to access data. The request can be similar to the request to provide data received in step 401 of method 400. In some embodiments, the request in step 501 can be to provide data stored by database system 101 to an authorized system. The request can be received by the tracing system from an authorized system (e.g., authorized system 105) directly or indirectly (e.g., from another system, such as an application system or a database system, such as database system 101). In some embodiments, the request can specify the data to be provided (e.g., through search terms, logical operators, or other suitable methods of requesting particular data).

In step 503 of method 500, the tracing system can generate at least one tracer. The tracer can be generated as described above with regards to FIG. 3A and step 403 of method 400.

In step 505 of method 500, the tracing system can generate an altered version of the data (e.g., altered data 115). The tracing system can communicate (e.g., communicate 123) with the database system to obtain the requested original data (e.g., original data 113). The tracing system can then generate the altered version of the data by inserting tracers and/or additional rows into the original data. Consistent with disclosed embodiments, the tracers and/or additional rows can be inserted as described above with regards to FIG. 3A and step 403 of method 400.

In step 507 of method 500, the tracing system can store an association between the request and the altered version of the data. The request can be stored in a database or log file (e.g., log file 320, or the like), as described with respect to FIG. 3B and step 407 of method 400.

In step 509 of method 500, the tracing system can provide a response (e.g., response 125) to the request (e.g., request 121) received from the authorized system. The tracing system can provide the response directly to the authorized system, or through another system (e.g., through a database system or an application system). The response can include the altered data.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. Furthermore, non-transitory computer-readable media can contain instructions, that when executed by one or more processor, cause a computing system (e.g., a cloud computing platform, computing cluster, or the like) to implement the disclosed systems and methods. In addition, while certain components have been described as being coupled to one another, such components may be integrated with one another or distributed in any suitable fashion.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for tracing data, comprising:
at least one processor; and
at least one non-transitory computer-readable medium containing instructions that, when executed by the system, cause the system to perform operations comprising:
receiving a request to provide first data, the request associated with provision request metadata;
generating a tracer;
generating an altered version of the first data, generation comprising reversibly modifying a value of the first data to include the tracer;
storing an association between the request and the altered version of the first data, the association including the provision request metadata; and
storing the altered version of the first data in response to the request.

2. The system of claim 1, wherein:
the value comprises:
an element of a table;
a value of a key-value pair;
a value of a field; or
an instance of an object.

3. The system of claim 1, wherein:
the value comprises:
a column name of a table;
a key name of a key-value pair;
a field name of a field; or
an object name of an object.

4. The system of claim 1, wherein:
the value being a first numeric value;
the tracer being expressed as a second numeric value; and
reversibly modifying the value comprises generating a combined value using the value and the tracer, the insignificant figures of the combined value representing the tracer.

5. The system of claim 1, wherein:
the value of the data is a text value; and
reversibly modifying the value comprises:
embedding the tracer into the value; or
concatenating the tracer and the value.

6. The system of claim 1, wherein:
generation further comprises:
adding at least one field, key, or column to the first data, the at least one field, key, or column added to the first data including instances of the tracer token.

7. The system of claim 6, wherein:
the at least one field, key, or column added to the first data further includes obfuscation values.

8. The system of claim 1, wherein:
storing the association comprises updating a database or log file associated with the first data to include:
association information based on the provision request metadata; or
the association information and the tracer token.

9. The system of claim 1, wherein:
the provision request metadata includes at least one of:
date or time information; or
requesting user information.

10. The system of claim 1, wherein:
the tracer corresponds to a portion of the first data; and
the tracer is generated based at least in part on at least some of the portion of the first data.

11. The system of claim 1,
wherein the operations further comprise:
receiving an access request to access the altered version of the first data, the access request associated with access request metadata;
generating a second tracer;
generating second data, generation comprising:
reversibly modifying a value of the altered version of the first data to include the second tracer; or
adding at least one field, key, or column to the altered version of the first data, the at least one field, key, or column added to the altered version of the first data including instances of the second tracer;
storing an association between the access request and the altered version of the first data; the second tracer including the access request metadata; and
providing the second data in response to the access request.

12. The system of claim 1,
wherein the operations further comprise:
obtaining suspect data, the suspect data including the tracer; and
identifying the request to provide the first data using the association and the tracer.

13. The system of claim 1,
wherein generation comprises:
reversibly modifying a predetermined number or proportion of values of the data to include the tracer; or
reversibly modifying the values to include the tracer with a predetermined probability.

14. A method for tracing data, comprising:
receiving a request to provide first data, the request associated with provision request metadata;
generating a tracer;
generating an altered version of the first data, generation comprising reversibly modifying a value of the first data to include the tracer;
storing an association between the request and the altered version of the first data, the association including the provision request metadata; and
storing the altered version of the first data in response to the request.

15. The method of claim 14,
wherein reversibly modifying a value of the first data comprises:
- reversibly modifying a predetermined number or proportion of values of the first data to include the tracer; or
- reversibly modifying the values to include the tracer with a predetermined probability.

16. The method of claim 14, wherein:
the value includes an element of a table, a value of a key-value pair, a value of a field, or an instance of an object; or the value includes a column name of the table, a key name of the key-value pair, a field name of the field, or an object name of the object.

17. The method of claim 14, wherein:
the value comprises a text value; and
reversibly modifying the value comprises:
- embedding the tracer token into the value; or
- concatenating the tracer and the value.

18. The method of claim 14, wherein:
the tracer corresponds to a portion of the first data; and
the tracer is generated based at least in part on at least some of the portion of the first data.

19. The method of claim 14, the method further comprising:
- receiving an access request to access the altered version of the first data, the access request associated with access request metadata;
- generating a second tracer based at least in part on the access request metadata;
- generating second data, generation comprising:
  - reversibly modifying a value of the altered version of the first data to include the second tracer; or
  - adding at least one field, key, or column to the altered version of the first data, the at least one field, key, or column added to the altered version of the first data including instances of the second tracer;
- storing an association between the access request and the altered version of the first data; and
- storing the second data in response to the access request.

20. The method of claim 14, the method further comprising:
- obtaining suspect data, the suspect data including the tracer; and
- identifying the request to provide the data using the database or log file and the tracer.

* * * * *